May 5, 1964 K. R. LESSMANN 3,132,192
MEANS FOR PURIFYING WASTE GASES
Filed Sept. 1, 1960 2 Sheets-Sheet 1

INVENTOR.
KURT LESSMANN
BY
ATTORNEY

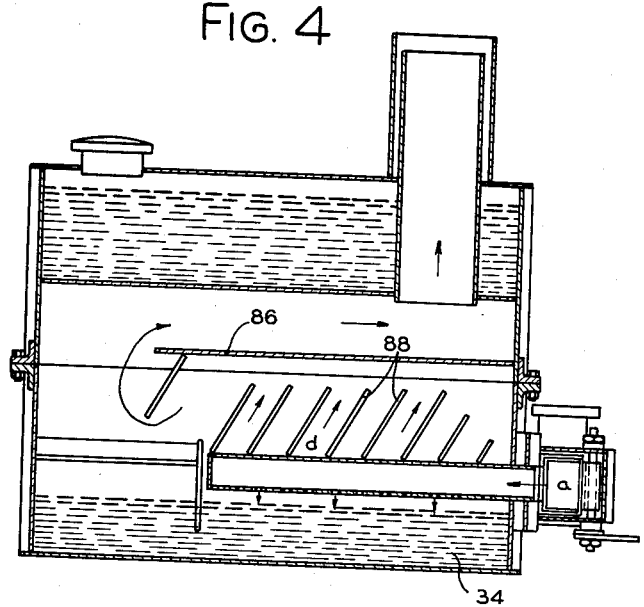
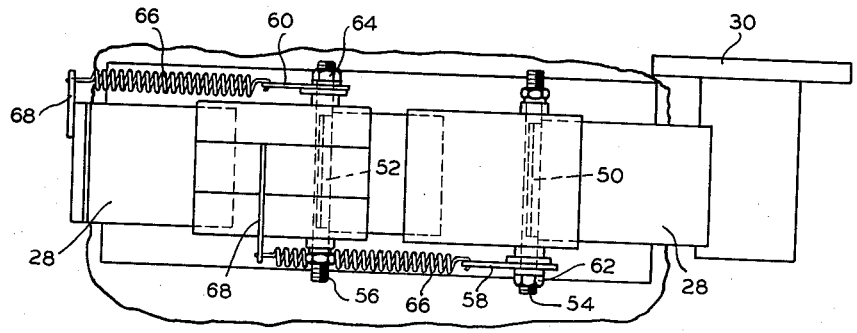

United States Patent Office 3,132,192
Patented May 5, 1964

3,132,192
MEANS FOR PURIFYING WASTE GASES
Kurt R. Lessmann, Mulheim (Ruhr), Germany, assignor to Ruhr Intrans Hubstapler, G.m.b.H., a company of Germany
Filed Sept. 1, 1960, Ser. No. 53,521
2 Claims. (Cl. 261—59)

This invention relates to a means for purifying waste gases, especially of internal combustion motors, and more particularly to such a means which directs such gases into a cleaning fluid with substantial velocity.

It is known to purify waste gases of combustion engines with the aid of a cleaning fluid composed of water and, if desired, chemical additives. Prior devices of the type utilizing cleaning fluids generally require that the gases to be purified are conducted through the cleaning fluid, and in the process, are brought into sufficiently intimate contact with the fluid so that the undesirable components of the gases are dissolved or precipitated out of the exhaust flow. The components to be removed for effective purification concern principally unburned carbons which, in the form of solid particles of soot, for example, are precipitated. It is necessary in prior processes to either retain the exhaust gases for a relatively long time in the cleaning fluid, or conduct same through one or more filters. If the gases are to be retained for a relatively long period of time in the cleaning fluid, the cleaning fluid must be of relatively large volume and must be provided with mechanical devices such as agitators in order to precipitate the solid particles out of the gaseous flow. If, on the other hand, filters are used, these must be changed periodically and cleaned. Moreover, in such prior devices the resistance to flow of the exhaust gases is often increased to an extent that a suction device, such as a fan, becomes necessary in order to overcome the resistance to flow.

It is known to free the exhaust gases of steam boiler heating systems from the sulphur dioxide entrained therein by spraying a cleaning fluid into the exhaust gas flow. For this purpose a stationary washing tower is necessary with which a multiplicity of containers, filters, and other accessories work in cooperation. Obviously, such an installation is not suitable for the purifying of exhaust gases of combustion engines, in which, because of the liquid fuel used, the proportion of sulphur contained in the exhaust flow is negligible.

In the present invention purification of the exhaust gases is facilitated by a construction which divides the exhaust gases into a multiplicity of small streams which are directed to strike the surface of the cleaning fluid with such velocity, preferably constant, that the cleaning fluid becomes turbulent and the heavier components of the exhaust, such as soot, tar, oil vapors, and the like, penetrate into the purifying liquid where such components are separated from the gaseous components and remain as suspended particles in the cleaning fluid. The purified exhaust gases which rise from the cleaning fluid are then freed of any liquid particles which are carried along thereby and the purified gases are then conducted into the atmosphere. By this apparatus, which dispenses with mechanical devices for purifying the exhaust gases, an effective and rapid separation of the undesirable components of the gases is achieved. As the exhaust gases strike the surface of the cleaning fluid with substantial velocity, the entrained components which have a relatively high specific weight, such as soot, tar, oil vapors, and the like, are separated from the gaseous parts and remain in the cleaning fluid as suspended particles, as noted above. Also, the turbulence created in the cleaning fluid is of advantage in that an intensive washing of the exhaust gases is achieved.

It is a principal object of the invention to provide an improved apparatus for purifying contaminated exhaust gases by dividing a flowing stream of such gases into a plurality of separate streams which are directed under velocity to impinge upon the surface of an adjacent cleaning fluid.

Another object of the invention is to regulate the velocity of exhaust gas flow to be purified regardless of variations in load, speed, or other conditions of engine operation.

A further object of the invention is to provide a means which separates from exhaust gases in a relatively efficient and simple manner both the solid and liquid particles which are entrained therein.

Another object of this invention is to provide a generally improved gas purifier construction which is relatively simple to manufacture and maintain, which minimizes the use of mechanical parts, and which purifies contaminated exhaust gases quickly and efficiently.

Other objects, features, and advantages of the invention will appear to persons skilled in the art as the description proceeds.

The purifying means in the present invention includes a body of a cleaning fluid contained at a predetermined level within a closed housing provided with an outlet tube and preferably a plurality of inlet tubes for the exhaust gases, the inlet exhaust gas tubes projecting into the housing above the liquid level and being closed at their inner ends. The undersides of the inlet tubes are provided with a plurality of nozzle-like passages, each of which is adapted to direct a fine stream of exhaust gas toward the surface of the cleaning liquid at a controlled velocity. A deflection or rebound plate is arranged above the inlet tubes for separating out of the exhaust gases which rise from the cleaning liquid entrained liquid particles.

No mechanically operated devices or filters are required, and the purifying device is of such dimensions that it can be readily accommodated on small passenger vehicles, for example. Also, means are provided for facilitating cleaning and maintenance, filling of the closed housing with cleaning fluid to a predetermined level, and for regulating the velocity of exhaust gases into the purifying device regardless of varying motor speeds and loads. The velocity regulating means can be adjusted so as to be adapted to function properly in combination with combustion engines of differing characteristics. The exhaust gas velocity control makes possible an adjustment of the velocity to the most favorable impact pressure on the cleaning fluid for the purifying effect. Depending upon the kind and amount of dirt particles contained in the exhaust gas, more or less penetration of these particles into the cleaning fluid can be controlled as desired. At the same time, depending upon the degree of contamination of the exhaust gases, the surface of the cleaning liquid is more or less agitated so that a corresponding washing of the gases is effected.

In the drawings:

FIGURE 4 is a vertical longitudinal section taken through a somewhat modified form of the device of FIG. 1; and FIGURE 5 is an enlarged elevational view of the lower right-hand side portion of FIG. 1.

Figure 1:
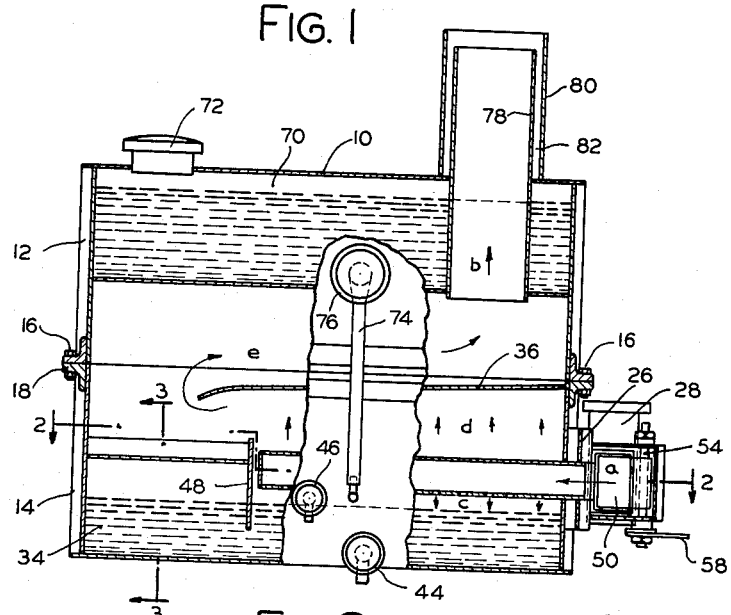
FIGURE 1 illustrates a vertical longitudinal section of a purifying device constructed in accordance with the principles of the present invention.

The purifying device comprises a rectangular housing 10 consisting of upper and lower portions 12 and 14, which are secured together by means of a plurality of peripherally located bolts 16 connecting flanges 18 of the housing portions. Three inlet exhaust tubes 20, 22, and 24 extend in parallel relation inwardly of the lower housing 14, having closed inner ends and being suitably supported at the other ends in a boss 26 which extends across the one side of the lower housing. The outer ends of the exhaust tubes open into a connecting conduit 28 which, by means of flange 30, is adapted to be connected with the exhaust pipe, not shown, of a combustion engine. Exhaust tubes 20, 22 and 24 preferably extend into the housing approximately two-thirds of the length thereof. A plurality of staggered small diameter openings 32 are formed in the underside of each exhaust tube for receiving and directing finely divided streams of exhaust gases downwardly along the path indicated by arrows c toward the surface of the purifying liquid contained in the lower housing and indicated by numeral 34.

Above the exhaust tubes is a rebound plate 36 which slopes toward the closed ends of the exhaust tubes for separating out of the exhaust gases liquid particles entrained thereby. In housing section 14 there are also located, in the space 38 under the end of the rebound plate 36 and beyond the closed ends of the exhaust tubes at approximately the height of said tubes, drip plates 40 and 42 which slope inwardly toward the center of the housing and the surface of the cleaning liquid for returning cleaning liquid which is separated from the exhaust gases to the body of liquid 34. Drip plates 40 and 42 are secured to a dividing wall 48 which extends transversely of the exhaust tubes in front of the closed ends thereof, under the surface of the liquid, and over the level of the upper sides of the exhaust tubes. The front wall of housing section 14 is equipped with an exhaust valve 44 and a sampling valve 46 which establishes the level of the cleaning fluid.

Figure 2:
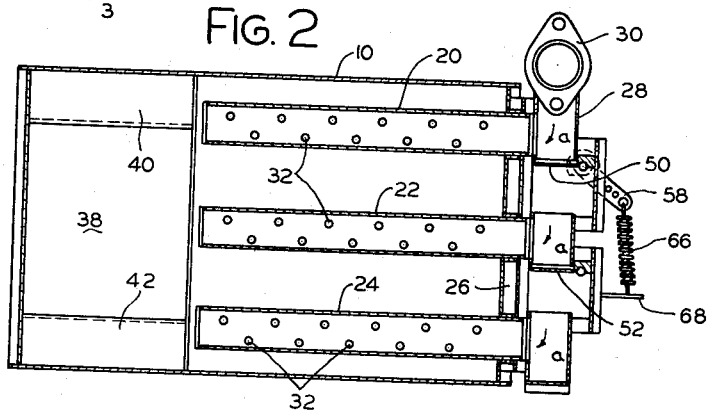
FIGURE 2 is a section taken along line 2—2 of FIG. 1.
Figure 3:
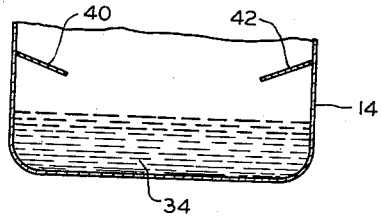
FIGURE 3 is a vertical partial section taken along line 3—3 in FIG. 1.

Referring specifically to FIG. 5, in the exhaust gas collecting pipe 28 there are provided flapper valves 50 and 52 which are mounted for horizontal swinging movement on vertical pivot pins 54 and 56, respectively. Secured to pivot pins 54 and 56 are a pair of lever arms 58 and 60, respectively, which may be adjusted angularly in a horizontal plane by means of nuts 62 and 64. Each lever arm is connected to one of a pair of springs 66 which are in turn secured to one of a pair of members 68 connected with the exhaust pipe 28. As is apparent in FIG. 2, the sections of exhaust pipe 28 adjacent the open ends of exhaust tubes 20 and 22 are provided with flapper valves 50 and 52, whereas the section of the exhaust pipe adjacent exhaust tube 24 is not so equipped. Although the exhaust tube diameters are illustrated as being of the same diameter, these may be varied as desired in the event operating conditions so require.

Housing section 12 includes a reservoir 70 for the cleaning fluid 34, and in its cover it has a filler opening which is closed by a removable cap 72. From the bottom of the reservoir 70 extends a conduit 74 which leads to the bottom portion of housing section 14, having a shut-off valve 76 connected at the upper end thereof. An outlet exhaust pipe 78 is secured to the upper housing for receiving purified exhaust gases flowing in the direction of arrows b. Pipe 78 extends into a cylindrical member 80 of larger diameter forming an annular hollow space 82 therewith. Space 82 communicates with reservoir 70 through an opening, not shown, in the housing.

The construction of the purifying device as shown in FIG. 4 is slightly modified in the form of rebound plate 86, and in the provision of rebound cross members 88 which extend diagonally upwardly from the upper sides of the exhaust tubes 20, 22 and 24.

In both forms of the construction the exhaust gases to be purified are conducted through the inlet pipe 28 in the direction of arrows a. Depending upon the type and size of the combustion engine associated therewith, two or more exhaust tubes having round or rectangular sections are provided which connect with the exhaust pipe 28. Flapper valves 50 and 52 are set by adjusting lever arms 58 and 60 to provide a relatively short or long moment arm as desired, from the pivot pins 54 and 56, and/or by selection of the rate of springs 66 such that the engine operating characteristics are taken into account. That is, so as to permit the exhaust gases to emerge into the exhaust tubes 20, 22 and 24 and through the nozzle-like openings 32 with such velocity that the exhaust gases strike the surface of the cleaning fluid 34 in the direction of arrows c with an impact sufficient to insure the desired purifying effect. By adjusting the flapper valves the manner of operation of the device can be adapted to various operating requirements such as may occur in a two or four-stroke motor or a carburetor or diesel motor. The impact of the exhaust gases on the cleaning fluid causes the particles of greater specific gravity entrained therein, such as soot, tar and oil vapors, to strike the surface of the liquid with greater force and therefore penetrate deeper into the liquid than the gaseous components. The cleaning fluid may comprise merely water, or water plus chemical additives such as water glass, caustic soda and soda. The heavier components to be separated out of the exhaust gases are consequently precipitated from the gaseous parts and remain in the liquid as suspended particles. The relatively high velocity gases agitate the cleaning fluid at the surface and bring about an intensive washing which de-greases the gases.

After leaving the cleaning fluid, the exhaust gases rise in the direction of arrows b in the space above the exhaust tubes and under rebound plate 36 or 86, and are there separated from any liquid particles entrained therein. Liquid collected on the underside of the rebound plate drops onto drip plates 40 and 42 situated in the range of the downwardly extending end of the rebound plate, which drip plates return the liquid to the body of cleaning fluid 34. The purified gases leave the housing in the direction of arrows e and b through outlet tube 78 and into the atmosphere.

When the speed or load of the combustion engine varies, flaps 50 and 52, if properly adjusted, regulate the opening in the corresponding sections of pipe 28 so that the exhaust gases are distributed in exhaust tubes 20, 22 and 24 such that the compression required for optimum cleaning effect is controlled. That is, the gas velocity which is generated through openings 32 achieves the requisite impact of the fine streams of gas on the cleaning fluid. This feature becomes especially important during acceleration of the engine, during which time a relatively large proportion of unburned residues are entrained in the exhaust gases, at which time it is important that relatively high velocity of the exhaust through the openings 32 in each of the tubes 20, 22 and 24 be present to maximize the impact force at the surface of the cleaning fluid and to create sufficient agitation thereof to purify the gases. By means of the rebound cross pieces 88 in FIG. 4 the separation of entrained liquid particles rising in the direction of arrows b is accelerated. In both the embodiments of FIGS. 1 and 4 the dividing wall 48 contributes to proper guidance of the exhaust gases, and thereby aids in freeing the exhaust gases of entrained liquid particles.

Maintenance of the purifying device is very simple. In order to fill or supplement cleaning fluid 34, with the discharge valve 44 closed, the sampling valve 46 is opened and then, by opening the shut-off valve 76, the cleaning fluid is allowed to be replenished from the supply tank 70 throught he connecting conduit 74. When fluid begins to emerge from sampling valve 46 the desired liquid level for operation is present. The sampling valve 46 and shut-off valve 76 are thereupon closed and the device is ready for operation. Supplementary filling of cleaning fluid in reservoir 70 may be accomplished after removing plug 72. In order to clean the device, after removal of bolts 16, the housing sections 12 and 14 are disassembled so that lower portion 14 can be washed out. By means of the tube 80 surrounding exhaust pipe 78, any condensation which forms in the outer surface of pipe 78 is collected and flows back into reservoir 70.

Now, while I have shown and described what I believe to be preferred embodiments of my present invention, it will be understood that various rearrangements and modifications may be made therein without departing from the spirit and scope of my invention. For example, any suitable type of valve or other regulating device may be substituted for flapper valves 50 and 52. Also, it will be apparent that the housing need not be rectangular in form, but may for example, be circular in section with the exhaust tubes formed as annular or semi-annular members. In the latter case it is expedient to provide discharge pipe 78 in the center section above the annularly extending exhaust tubes. If desired, the feed of cleaning fluid from the supply tank into the lower housing for maintaining a requisite level of cleaning liquid may be automatically regulated by a float valve or the like, which may, by means of a relay switch and electro-magnetic operated shut-off valve, for example, open and close the outlet of the supply tank.

I claim:

1. A device for purifying exhaust gases of combustion engines comprising a housing, an exhaust pipe adapted to be connected to the exhaust side of the engine and extending along one side of the housing, an exhaust tube connected to the exhaust pipe and extending horizontally a substantial distance into the housing, a plurality of openings formed in the bottom side of the exhaust tube for dividing the flow of exhaust gases received from the exhaust pipe into a plurality of downwardly directed streams, a body of exhaust gas cleaning fluid contained in the housing having its surface located a predetermined distance beneath the bottom side of the exhaust tube, valve means associated with the exhaust pipe controlling the velocity of exhaust gases entering the exhaust tube from the exhaust pipe, means urging said valve means to a closed position, the exhaust gases flowing in the exhaust pipe varying in velocity as a function of the operating conditions of the engine, said valve means being responsive to variations in the velocity of the exhaust gases passing through the exhaust pipe and opening an amount which is a function of said velocity such that the velocity of exhaust gases passing through the exhaust tube openings is controlled by said valve means, and means for adjusting the setting of said valve means as a function of the operating characteristics of an engine with which the device is associated.

2. A device for purifying exhaust gases of combustion engines comprising a housing, a reservoir located in the upper portion of said housing, cleaning fluid in said reservoir, a conduit including a valve for transferring said cleaning fluid to the lower portion of said housing, an exhaust pipe adapted to be connected to the exhaust side of the engine, an exhaust tube connected to the exhaust pipe and extending a substantial distance into the lower portion of said housing at a predetermined distance above the cleaning fluid, a plurality of relatively small openings formed in the bottom side of the exhaust tube for dividing the flow of exhaust gases received from the exhaust pipe into a plurality of downwardly directed streams of a velocity sufficient to penetrate the cleaning fluid causing turbulence thereof whereby to separate entrained components of greater specific gravity from those of lesser specific gravity and to wash the gases, valve means for controlling the level of cleaning fluid in the lower portion of said housing, and valve means associated with the exhaust pipe and responsive to the velocity of gases flowing through the exhaust pipe, said valve means opening an amount which varies as a function of said velocity for controlling the velocity of the gas entering the exhaust tube.

References Cited in the file of this patent

UNITED STATES PATENTS

| | | |
|---|---|---|
| 661,276 | Reenstierna | Nov. 6, 1900 |
| 1,114,876 | Goodspeed | Oct. 27, 1914 |
| 1,142,073 | Wolff | June 8, 1915 |
| 2,348,357 | Parks | May 9, 1944 |
| 2,853,152 | Swift | Sept. 23, 1958 |
| 2,880,079 | Cornelius | Mar. 31, 1959 |
| 2,936,230 | Larsen | May 10, 1960 |

FOREIGN PATENTS

| | | |
|---|---|---|
| 1,589 | Great Britain | May 5, 1874 |
| 2,086 | Great Britain | Jan. 26, 1898 |
| 74,389 | Austria | June 10, 1918 |
| 77,624 | Sweden | June 27, 1933 |
| 265,299 | Switzerland | Feb. 16, 1950 |